US010032156B2

(12) United States Patent
Al-Sahli (10) Patent No.: US 10,032,156 B2
(45) Date of Patent: Jul. 24, 2018

(54) SYSTEM AND METHOD FOR CONDUCTING FINANCIAL TRANSACTIONS USING A MOBILE DEVICE

(71) Applicant: Mahmoud Anass Mahmoud Al-Sahli, Mississauga (CA)

(72) Inventor: Mahmoud Anass Mahmoud Al-Sahli, Mississauga (CA)

(*) Notice: Subject to any disclaimer, the term of this patent is extended or adjusted under 35 U.S.C. 154(b) by 0 days.

(21) Appl. No.: 13/875,028

(22) Filed: May 1, 2013

(65) Prior Publication Data
US 2013/0246265 A1    Sep. 19, 2013

Related U.S. Application Data

(63) Continuation of application No. 12/918,462, filed as application No. PCT/CA2008/000935 on May 14, 2008.

(30) Foreign Application Priority Data

Mar. 9, 2008    (JO) .................................. P.110/2008

(51) Int. Cl.
*G06Q 40/00*    (2012.01)
*G06Q 20/32*    (2012.01)
(Continued)

(52) U.S. Cl.
CPC ..... *G06Q 20/3229* (2013.01); *G06Q 20/1085* (2013.01); *G06Q 20/18* (2013.01);
(Continued)

(58) Field of Classification Search
CPC ...... G06Q 40/00; G06Q 20/32; G06Q 20/341; G06Q 20/04; G06Q 20/108; G06Q 40/02; G06Q 40/04; G06Q 40/06
(Continued)

(56) References Cited

U.S. PATENT DOCUMENTS

| 5,907,804 A |   | 5/1999 | Schroderus et al. |
| 6,142,369 A | * | 11/2000 | Jonstromer ................... 235/380 |

(Continued)

FOREIGN PATENT DOCUMENTS

| WO | 2006/056802 A1 | 6/2006 |
| WO | 2004/049093 A1 | 9/2006 |

(Continued)

OTHER PUBLICATIONS

Canadian Office Action dated Feb. 15, 2011 in Canadian Application No. 2,716,276.
(Continued)

*Primary Examiner* — Hai Tran
(74) *Attorney, Agent, or Firm* — Hayes Soloway PC (57) ABSTRACT

A Subscriber Identity Module (SIM) Chip Bank system and method for enabling users registered in the system to control their financial and telecommunications resources from their mobile device over a mobile communications network. The system combines mobile network providers and financial services through the use of SIM chips without the need for modifying the users' mobile devices or SIM chip installed thereon. A SIM Chip Bank System Operator (SCB-O) regulates data flow between users, banks, mobile communications service providers, SIM Chip Automated teller Machines and SIM Chip Service Providing Machines through a plurality of communications channels. Upon a user connecting to the SCB-O to request a transaction, the SCB-O connects to the appropriate bank to authorize the requested transaction. Upon successful completion, reports are sent back and forth to users confirming the event.

18 Claims, 5 Drawing Sheets

(51) Int. Cl.
*G06Q 20/10* (2012.01)
*G06Q 20/40* (2012.01)
*G06Q 20/18* (2012.01)

(52) U.S. Cl.
CPC ............ *G06Q 20/32* (2013.01); *G06Q 20/40* (2013.01); *G06Q 20/4014* (2013.01)

(58) Field of Classification Search
USPC ..................................................... 705/35–45
See application file for complete search history.

(56) References Cited

U.S. PATENT DOCUMENTS

| | | | | |
|---|---|---|---|---|
| 6,711,262 | B1* | 3/2004 | Vatanen | 380/277 |
| 6,868,391 | B1* | 3/2005 | Hultgren | 705/17 |
| 7,258,267 | B2* | 8/2007 | Choi | 235/379 |
| 2007/0050871 | A1 | 3/2007 | Mashhour | |
| 2007/0255662 | A1* | 11/2007 | Tumminaro | 705/79 |
| 2008/0011825 | A1* | 1/2008 | Giordano et al. | 235/380 |

FOREIGN PATENT DOCUMENTS

| WO | 2006/095250 A1 | 9/2006 | |
|---|---|---|---|
| WO | WO 2006/095250 * | 9/2006 | ............ G06Q 20/00 |
| WO | 2008/008735 A2 | 1/2008 | |

OTHER PUBLICATIONS

Canadian Office Action dated Jan. 12, 2012 in Canadian Application No. 2,716,276.
Canadian Office Action dated Oct. 18, 2012 in Canadian Application No. 2,716,276.
Notice of Allowance dated Feb. 15, 2013 in Canadian Application No. 2,716,276.

* cited by examiner

SYSTEM AND METHOD FOR CONDUCTING FINANCIAL TRANSACTIONS USING A MOBILE DEVICE

CROSS REFERENCE TO RELATED APPLICATIONS

This application claims priority from U.S. patent application Ser. No. 12/918,462, filed on Aug. 19, 2010, which claims priority from Jordan Application No. P.110/2008, filed on Mar. 9, 2008, in the Jordan Intellectual Property Office, the disclosures of which are incorporated herein by reference in their entirety.

FIELD OF THE INVENTION

The present invention relates to a Subscriber Identity Module (SIM) Chip Bank System and method. In particular, the system and method enable users to perform various bank (and other financial) operations and to acquire telecommunications services through the use of personal mobile phone with SIM chips installed thereon.

BACKGROUND OF THE INVENTION

The Internet has revolutionized the manner in which the financial services industry conducts business, in particular by providing customers with permanent accessibility through online and mobile banking business models, which alleviate the need for users to visit their correspondent financial institution. Typically, mobile banking allows customers of a bank to use their mobile devices to access banking services at anytime and from any location through a web browser or using software applications downloaded to the mobile device. Further applications, such as mobile contactless payments or fund transfer between mobile devices, are under development.

Still, one of the main challenges with current mobile banking systems is a lack of interoperability between different technology standards. In particular, a plurality of protocols is currently being used for mobile banking, thus making it difficult for mobile banking applications to connect multiple banks to provide financial services between accounts held within different banks. Also, given the large variety of mobile devices currently on the market, it is a challenge for banks to offer mobile banking solutions on any type of device. In particular, some devices necessitate Wireless Application protocol (WAP) capabilities to have access to a Uniform Resource Locator (URL) of the corresponding banking server, while others require installation of software applications on the mobile device (thus requiring the device to have relatively large memory capacity) or even complete replacement of the mobile device's Subscriber Identity Module (SIM) card with extended function SIM cards. In addition, most prior art banking systems require service providers to be equipped with Point-Of-Sale (POS) terminals to confirm the occurrence of a transaction. Other systems necessitate special chips to be integrated in the mobile devices to enable users to remotely access Automated Teller Machines (ATMs), POS terminals and the like, which are in turn equipped with SIM card readers. As a result, the complexity of the overall system is significantly increased. Moreover, strong security concerns arise as financial transactions are executed from remote locations.

What is therefore needed, and an object of the present invention, is a simplified and efficient SIM chip banking system that enables users to control their financial and telecommunications resources from their mobile device.

SUMMARY OF THE INVENTION

In order to address the above and other drawbacks, there is disclosed a method for enabling a user of a network enabled mobile device and having an account at a bank to effect financial transactions by directly accessing the account over a wireless network, the mobile device having associated therewith an identifier. The method comprises registering the mobile device with the bank for acquiring mobile payment capabilities, the registering comprising associating the identifier with the account, providing a system operator in communication with the bank, establishing a connection between the mobile device and the system operator, requesting a financial transaction using the account via the connection, the system operator authenticating the user through the identifier and upon authentication directing the request to the bank, and the bank communicating with the user for confirming the request prior to effecting the financial transaction.

There is also disclosed a system for enabling a user of a network enabled mobile device and having an account at a bank to effect financial transactions by directly accessing the account over a wireless network. The mobile device has associated therewith an identifier and has been registered with the bank for acquiring mobile payment service capabilities, the registration comprising associating the identifier with the account. The system comprises a system operator in communication with the bank, and a connection between the mobile device and the system operator. When the user requests a financial transaction using the account via the connection, the system operator authenticates the user through the identifier and upon authentication directs the request to the bank, the bank communicating with the user for confirming the request prior to effecting the financial transaction.

Other objects, advantages and features of the present invention will become more apparent upon reading of the following non-restrictive description of specific embodiments thereof, given by way of example only with reference to the accompanying drawings.

DETAILED DESCRIPTION OF THE ILLUSTRATIVE EMBODIMENTS

The present invention is illustrated in further details by the following non-limiting examples which are illustrated with respect to banks. However a person skilled in the art should appreciate that the same system and method are applicable for any financial institution (and not necessarily a bank) providing user accounts.

Figure 1:
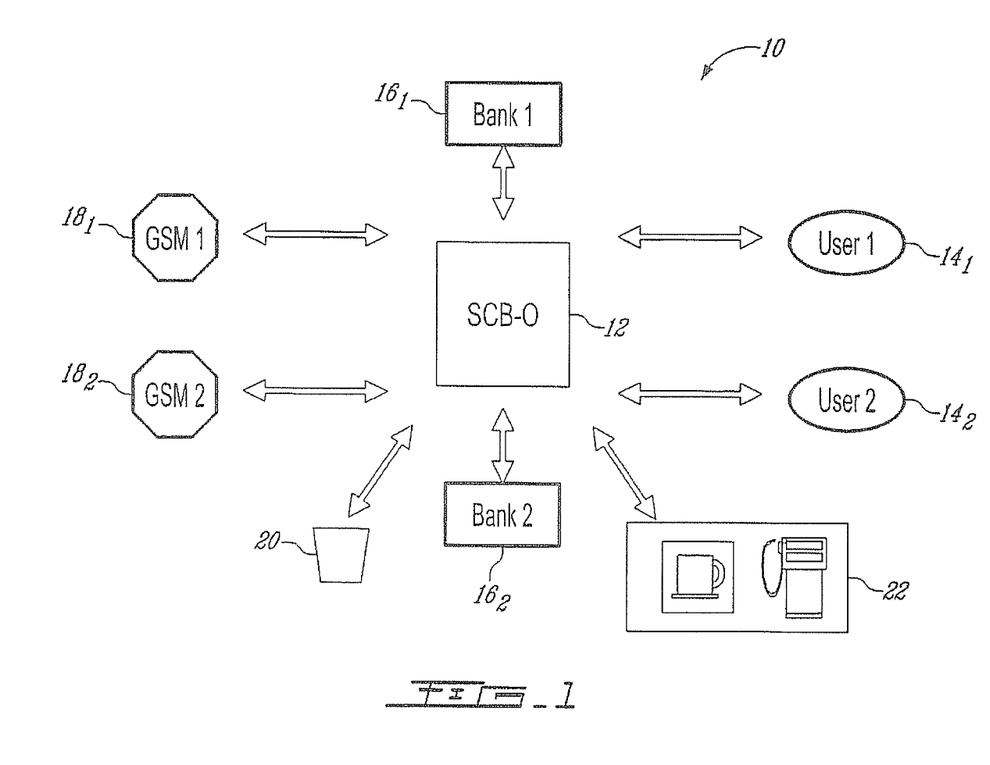
FIG. 1 is a schematic diagram of a Subscriber Identity Module SIM Chip Bank system in accordance with an illustrative embodiment of the present invention.

Referring now to FIG. 1, and in accordance with an illustrative embodiment of the present invention, a Subscriber Identity Module (SIM) Chip Bank system (SCB-system), generally referred to using the reference numeral 10, will now be described. The SCB-system 10 comprises a SIM Chip Bank System Operator (SCB-O) 12 in communication with a plurality (illustratively two (2)) of users as in $14_1$, $14_2$, banks (or other financial institutions) as in $16_1$, $16_2$, and wireless communication network providers (e.g. operator systems using the Global System for Mobile communications (GSM) standard) as in $18_1$, $18_2$ for enabling the users as in $14_1$, $14_2$ to remotely effect financial transactions as well as access telecommunication services through their network enabled mobile devices (references $24_1$ and $24_2$ in FIG. 2). In addition, the SCB-system 10 further enables users as in $14_1$, $14_2$ to access banking (or other financial institution-related) terminals as in 20, such as an SCB-system Automated Teller Machine (SC-ATM), to perform withdrawals of banknotes, cash transfers, or the like through the GSM networks as in $18_1$, $18_2$ using the mobile devices $24_1$, $24_2$. The system 10 further allows communication with SIM Chip Service Providing Machines (SCSPMs) as in 22, which provide users with a plurality of services such as beverage and food vending or fuel pumping.

Figure 2:
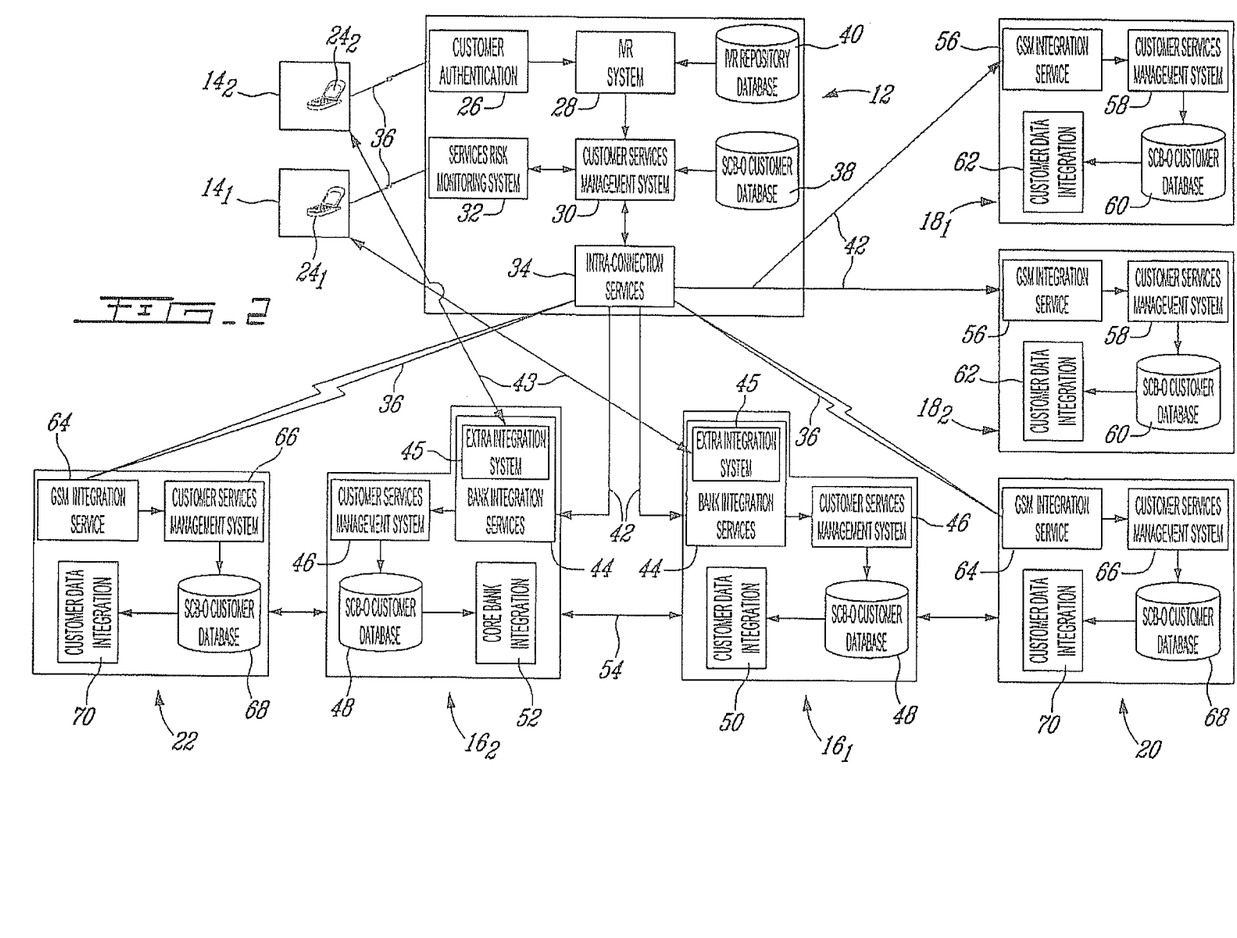
FIG. 2 is a detailed schematic diagram of a Subscriber Identity Module SIM Chip Bank system in accordance with an illustrative embodiment of the present invention.
Figure 3:
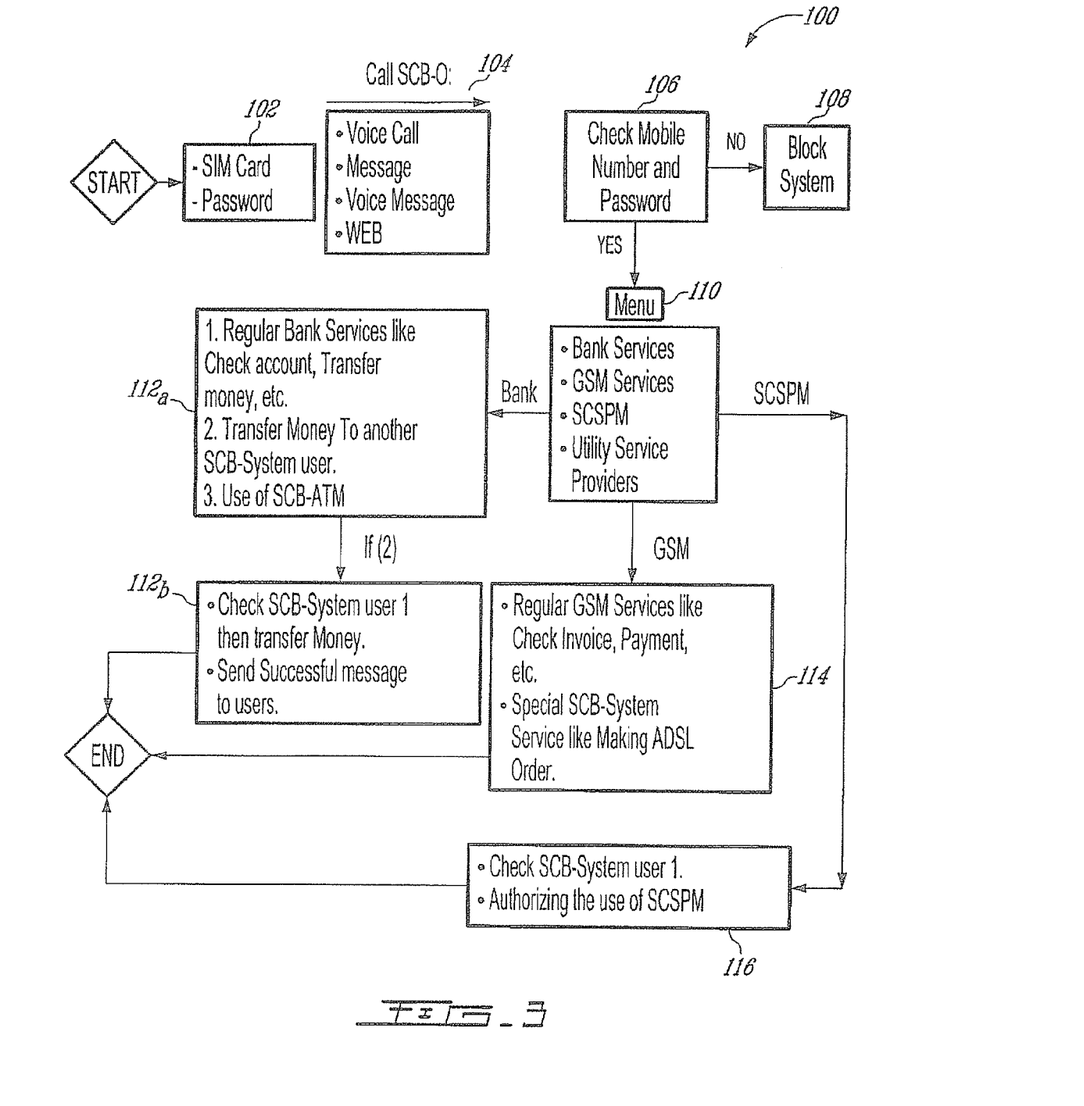
FIG. 3 is a flowchart of a method implemented in a Subscriber Identity Module SIM Chip Bank system in accordance with an illustrative embodiment of the present invention.

Referring now to FIG. 2 in addition to FIG. 1, the mobile devices $24_1$, $24_2$ illustratively include cellular phones, Personal Digital Assistants (PDAs), smart phones, and the like, which are equipped with a SIM chip (not shown). To access services of the SCB-system 10, the user $14_1$, $14_2$ illustratively registers with the SCB-O 12 for the services by registering the mobile device $24_1$, $24_2$ (by registering a unique identifier related to the mobile device) and/or the unique identifier associated with the device's SIM chip (for example, the MSISDN or phone number associated with the SIM chip). This advantageously enables users as in $14_1$, $14_2$ to control their financial and telecommunication resources via their personal mobile device as in $24_1$, $24_2$ without having to modify either the mobile device as in $24_1$, $24_2$ or the SIM chip. In this optic, users do not need to store financial information or any other extrinsic information and/or identifiers on the mobile device and/or the SIM chip. The registration process comprises registering the mobile device and/or SIM chip unique identifier with the system operator and with the financial institution (i.e. bank) for acquiring mobile payment capabilities. The registration with the system operator and the financial institution comprises associating the unique mobile and/or SIM chip identifier with the user, his/her financial institution and financial (bank) account and storing the information in the SCB-O Customer Database accessible to the system operator (38) and the SCB-O Customer Database accessible to the first bank (48). The SIM chip/mobile device identifier along with the user identity user financial (bank) account can be stored in both databases 38 and 48. Preferably, the registration at the system operator consists of registering the SIM chip and/or mobile identifier along with an indication of the user financial institution, and the registration at the financial institution (bank) consists of registering the SIM chip and/or the mobile device identifier in association with the user identity to which the financial (bank) account is mapped. In doing so, the financial (bank) account information (which is considered sensitive information) remains confidential between the user and his/her financial institution without sharing it with the system operator. However, a person skilled in the art should appreciate that the registration process can be carried out in a plurality of ways in such a manner to permit the system operator and the financial institution (i.e. bank) to ultimately associate the SIM chip and/or mobile identifier with the user financial account. The financial requests are initiated by the users using the mobile devices and comprise details about the desired financial transaction to conduct (e.g. transfer of US$ 3000 to RBC, account number 53254114563). Referring now to FIG. 2, the SCB-O 12 illustratively comprises an authentication system 26, an automatic answering system 28, such as an Interactive Voice Response (IVR) system, a customer service manager system 30, a services risk monitoring system 32 and an intra-connection services system 34, all of which are connected via suitable communications means (not shown) such as a local area network (LAN) or the like. As illustrated in FIGS. 2 and 3, the authentication system 26 illustratively receives incoming communications (e.g. voice calls over GSM call lines as in 36 or incoming data such as text messages or web requests or the like) from the mobile devices as in $24_1$, $24_2$ of users $14_1$, $14_2$ wishing to access the financial services. After verifying the identity of the mobile devices as in $24_1$, $24_2$, the authentication system 26 diverts (via a switch or the like, not shown) the incoming calls to the appropriate system. The verification is carried out by determining the mobile phone and/or SIM chip used to initiate the communication by tracing out the SIM chip and/or mobile unique identifier used to initiate the communication. Equipments configured to trace out the SIM chip and/or mobile unique identifiers are well known in the art. Examples of said equipments comprise Equipment Identity Registers and generic calling switches provided by Ericsson, Nortel and Panasonic who have a built systems to identify any calling number (Caller ID Service).

As illustrated in FIGS. 2 and 3, if the user $14_1$ is not successfully authenticated (i.e. the mobile device $24_1$ is not registered), the call is directed to the customer service manager system 30, which handles customer service issues (e.g. unauthorized access, troubleshooting, etc.) arising in the SCB-system 10. For this purpose, the customer service management system 30 illustratively comprises a plurality of SCB-O application servers (not shown) and is connected to an SCB-O customer database 38 having stored therein information related to users (preferably, SIM chip/mobile unique identifier and an indication of the corresponding financial institution) as in $14_1$, $14_2$ registered with the system 10. Alternatively, if the user $14_1$, $14_2$ is successfully authenticated (i.e. the identifier associated with the device's SIM chip matches the information stored in the SCB-O customer database 38), the user is requested to specify the desired financial transaction. In the preferred embodiment, the call is transferred to the IVR system 28. The IVR system 28 illustratively comprises a plurality of IVR servers (not shown) and is connected to an IVR repository database 40, which contains information (i.e. financial transactions available to users) which are presented to users as in $14_1$, $14_2$ in a form of a menu for directing the latter to the desired requested service, as discussed in further detail herein below. Alternatively, when the communication initiated by the user is essentially data (such as a text message), the user can specify upfront in the message the financial transaction desired which is only processed by the system operator if the user is successfully authenticated. In another alternative option, the user is given the opportunity of specifying the financial transaction only when he/she is successfully authenticated.

Still referring to FIG. 2, once the users $14_1$, $14_2$ have been authenticated and directed to the desired requested service, the intra-connection services system 34 is used to direct the flow of transactions and orders via a router (not shown) between the banks (or financial institutions) as in $16_1$, $16_2$, the GSM providers as in $18_1$, $18_2$, the SC-ATM 20, the SCSPM 22 and the authorized users as in $14_1$, $14_2$. Illustratively, transactions and orders are transmitted by the intra-connection services system 34 to the financial institutions (banks) as in $16_1$, $16_2$ and GSM providers as in $18_1$, $18_2$ over secure leased Internet connections as in 42 (e.g. using a Secure Sockets Layer (SSL) protocol) or any other suitable means of connection and to the SC-ATM 20 and/or SCSPM 22 via the GSM call lines as in 36. The SCB-O transmits to the financial institution the SIM chip/mobile unique identifier traced out by the authentication system and the financial transaction desired to be conducted by the user. Security is further implemented by the services risk monitoring system 32, which monitors transactions effected by the users as in $14_1$, $14_2$ to block and prevent fraud.

Still referring to FIG. 2, the financial institutions (banks) as in $16_1$, $16_2$ illustratively each comprise a bank integration services system 44, which communicates with the intra-connection services system 34 of the SCB-O 12 to receive transaction orders and respond with the requested transactions. Illustratively, each bank integration services system 44 comprises an extra integration system 45, which is part of the integration process performed by the financial institution (bank) $16_1$, $16_2$. For this purpose, once transactions and orders are received from the SCB-O 12 via the connections as in 42, each extra integration system 45 establishes a communication channel (or Confirmation Request) 43 between a financial institution (bank) $16_1$, $16_2$ and a mobile device $24_1$, $24_2$ of a user $14_1$, $14_2$ wishing to access the services. This is done once the bank determines if said mobile device is a registered mobile device by inquiring the SCB-O Database (48) accessible to the bank for determining if there is a match with the SIM chip identifier received from the system operator. The communication with the user is illustratively through any suitable communication means (e.g. IVR, Short Message Service (SMS), or Multimedia Messaging Service (MMS)) and provides a customer $14_1$, $14_2$ contacted by a financial institution (bank) $24_1$, $24_2$ with a choice between confirming, modifying or cancelling the transaction order prior to processing thereof. This also comprises a further authentication of the user.

Still referring to FIG. 2, each financial institution (bank) $16_1$, $16_2$ further comprises a customer services management system 46 connected to a local SCB-O customer database 48 that holds customer information (i.e. SIM chip identifiers and corresponding bank account information). The customer services management system 46 illustratively retrieves the stored customer information to identify a user $14_1$, $14_2$ requesting a specific financial transaction, as relayed by the SCB-O 12. Upon identifying and authenticating the user $14_1$, $14_2$, transactions and/or other services to the corresponding financial account of the user $14_1$, $14_2$ are then issued by the financial institution (bank) $16_1$, $16_2$. The financial institution (bank) $16_1$ (or alternatively the financial institution (bank) $16_2$) further comprises a customer data integration and registration system 50 that allows the financial institution (bank) $16_1$ to register new users as in $14_1$, $14_2$ (upon request from the customer services management 30 of the SCB-O, for example). A core bank integration system 52 is further provided at the financial institution (bank) $16_2$ in the event where the financial institutions (banks) $16_1$, $16_2$ are linked via a financial network 54 that enables direct financial transactions and services between financial accounts held in both financial institutions (banks) $16_1$, $16_2$, as will be discussed further herein below.

Still referring to FIG. 2, the GSM operator systems as in $18_1$, $18_2$ illustratively each comprise a GSM operator integration services system 56, which communicates with the intra-connection services system 34 of the SCB-O 12 to receive transaction orders and respond with the requested transactions. For example, the GSM operator systems as in $18_1$, $18_2$ obtain customer information associated with the users as in $14_1$, $14_2$ and assess the GSM number validity of the mobile devices as in $24_1$, $24_2$. Similarly to the financial transaction systems as in $16_1$, $16_2$, the GSM operator systems as in $18_1$, $18_2$ illustratively comprise a customer services management system 58 connected to a local SCB-O customer database 60 for providing requested services to authenticated users as in $14_1$, $14_2$. The GSM operator systems as in $18_1$, $18_2$ further comprise a customer data integration and registration system 62 that similarly allows to register new customers as in $14_1$, $14_2$.

Still referring to FIG. 2, the SC-ATM system 20 and the SCSPM 22 similarly illustratively comprise a GSM operator integration services system 64, which communicates with the SCB-O 12 to obtain transaction orders through voice and visual validations for example, a customer services management system 66 connected to a SCB-O customer database 68 and a customer registration system 70, all of which perform functions similar to the functions of the customer services management system 58, the SCB-O customer database 60, and the customer data integration and registration system 62 described herein above.

Referring now to FIG. 3 in addition to FIG. 2, provided the GSM provider system $18_1$, $18_2$ is affiliated with the SCB-system 10, there is no need for a user $14_1$, $14_2$ to replace or modify the SIM chip currently installed on the mobile device $24_1$, $24_2$ as the SCB-system 10 allows any SIM chip to be registered in the system 10 regardless of the type of mobile device $24_1$, $24_2$ used. Illustratively, upon registration with the SCB-system 10 through the financial institution (bank) $16_1$, $16_2$ that the user $14_1$, $14_2$ is affiliated with, the SIM chip, which is illustratively either pre-paid and/or post-paid, is associated with the financial account held by the registered user $14_1$, $14_2$ at the financial institution (bank) $16_1$, $16_2$. Illustratively, the unique mobile phone number associated with the mobile device $24_1$, $24_2$ and stored on the SIM chip is used to identify the user $14_1$, $14_2$ at the SCB-O 12 (together with an associated password, for example a number of digits such as a PIN, and/or letters, and/or voice recognition). This unique identity ensures that the user $14_1$, $14_2$ can securely access the services provided by the system 10. In this manner, a SIM chip may illustratively be identified with the same unique identification at the SCB-O 12, the financial institutions (banks) as in $16_1$, $16_2$, and the GSM providers as in $18_1$, $18_2$.

Still referring to FIG. 3 in addition to FIG. 2, more than one mobile phone number may also belong to the same user $14_1$, $14_2$ and mobile device $24_1$, $24_2$ and in this case, the user holds more than one SIM chip, with each SIM chip associated with a unique mobile phone number. Each mobile phone number is 10 then subsequently identified by the SCB-O 12 and associated to the financial account of the user 14$_1$, 14$_2$. Accordingly, more than one SIM chip may be assigned by the SCB-system 10 to a single account (as a given user may have one or more mobile phones with unique SIM cards in his possession), with the degree of access granted by any number of SIM chips being pre-determined. In this manner, the user 14$_1$, 14$_2$ would illustratively be provided access to varied services (e.g. effect different financial transactions as described herein above) depending on the SIM chip installed on the mobile device 24$_1$, 24$_2$. For example, extra SIM chips may be allowed to connect to the services of the SCB-system 10 using the main identification yet be limited in function to a predetermined set of transactions (e.g. allowed to receive payment reports only but having no access to other services). Updated detailed financial and GSM information corresponding to a given identity is illustratively made readily available and synchronized in the SCB-system 10 through the leased line connections as in 42 between the SCB-O 12, the financial institutions (banks) as in 16$_1$, 16$_2$, and the GSM operator systems as in 18$_1$, 18$_2$.

Still referring to FIG. 3 in addition to FIG. 2, a method 100 for handling financial transactions between registered users (references 14$_1$ and 14$_2$ in FIG. 1) according to an illustrative embodiment of the present invention will now be described. Illustratively, a user 14$_1$ having an active financial account held with a financial institution (bank) 16$_1$ providing SCB services connects to the SCB-system 10 at 102 using the unique identifier (i.e. the mobile phone number) associated with the registered SIM chip. The connection is illustratively implemented by the mobile device 24$_1$ initiating a communication at 104 with the SCB-O 12 using the GSM call line 36 to dial the publicly known customer service number of the SCB-O 12. The communication is a combined voice and data connection and may be in the form of a voice call, a text message using the SMS protocol, a voice message, a call or message initiated on the mobile device 24$_1$ via the Internet, or an email. Once the communication (illustratively a voice call) is established, the customer authentication system 26 within the SCB-O 12 checks at 106 the mobile phone number associated with the SIM chip of the device 24$_1$ to identify whether the user 14$_1$ desiring to access the services of the SCB-system 10 is registered in the SCB-system 10 with the SCB-O 12. If the user 14$_1$ is not registered, the system 10 blocks the device 24$_1$ from accessing the services at 108 and the call is directed to the customer services management system 30 (as discussed herein above). Otherwise, the customer authentication system 26 transfers the call to the IVR system 28, which illustratively responds with pre-recorded or dynamically generated audio and presents at 110 the mobile device 24$_1$ with a menu of potential financial transactions available using the account to further direct the user 14$_1$ on how to process and enable selection (illustratively using a keypad comprised in the mobile device 24$_1$) of a desired transaction.

Still referring to FIG. 3 in addition to FIG. 2, a list of possible transactions is illustratively detailed in the menu presented to the mobile device 24$_1$ and comprises bank (financial) services, GSM services, services provided by the SCSPM 22 and services provided by other utility service providers (e.g. water or electricity providers). Examples of bank (financial) services (provided at 112$_a$ and 112$_b$) include regular bank (financial) services, such as obtaining financial account details (e.g. bank balance, line of credit, mortgage), and extended bank services such as bill payment, fund transfers to any other account held in the bank (financial institution) 16$_1$, macro or micro person-to-person payments among users as in 14$_1$, 14$_2$, credit services payments, or access to SC-ATMs as in 20. Examples of GSM services (provided at 114) include detailed calling information for the mobile device 24$_1$, invoice details and payment, Asymmetric Digital Subscriber Line (ADSL) orders and any other telecommunication services provided by the SCB-system 10.

Figure 4:
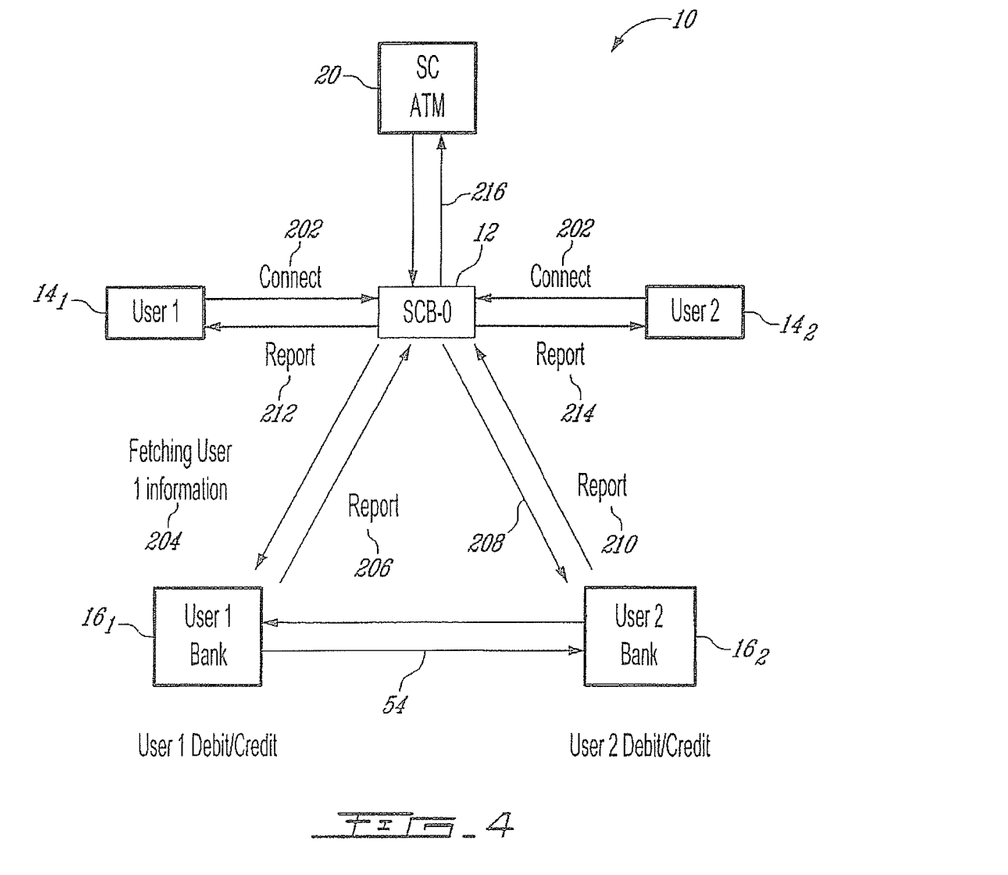
FIG. 4 is a flowchart of financial transaction process implemented in a Subscriber Identity Module SIM Chip Bank system in accordance with an illustrative embodiment of the present invention.

Referring now to FIG. 4 in addition to FIG. 2, in order to request a transfer of funds from a first user 14$_1$ to a second user 14$_2$, user 14$_1$ illustratively contacts the SCB-O 12 at 202 (and connects thereto using its unique ID number and password). The SCB-O 12 then verifies the ID number and password provided by the user 14$_1$ to ensure that the user is currently registered with the system 10 and has an active status. Once the user 14$_1$ has been authenticated, he SCB-O 12 contacts the financial institution (bank) 16$_1$ to which user 14$_1$ belongs to fetch the user's banking details as well as to request at 204 either a fund transfer from the financial account of user 14$_1$ to a financial account held by the SCB-O 12 in the same financial institution (bank) 16$_1$ or alternatively a fund holding from the financial account of user 14$_1$ for subsequent settlement with the SCB-O 12. Upon receiving this request, the financial institution (bank) 16$_1$ (after contacting the user 14$_1$, 14$_2$ via the extra integration system 45 to confirm, change, or cancel the transaction order, as mentioned herein above) either accepts or refuses the transaction and, upon approval of the latter, processes (using for example a suitable workstation, not shown) and confirms the transaction to the SCB-O 12 at 206. At 208, the SCB-O 12 then contacts the financial institution 16$_2$ to which user 14$_2$ belongs (after having ensured that user 14$_2$ is currently registered within the system 10) to issue an order to debit the SCB-O financial account and credit the financial account of user 14$_2$. If no financial account exists for the SCB-O 12, the financial institution 16$_2$ instead deposits the funds in the financial account of user 14$_2$ and subsequently requests settlement from the SCB-O 12. Upon completion of the transaction, financial institution (bank) 16$_2$ sends at 210 a confirmation message of success (or alternatively failure) to the SCB-O 12, which subsequently reports the confirmation to both users 14$_1$, 14$_2$ at 212 and 214 respectively.

Still referring to FIG. 4 in addition to FIG. 2, the SCB-system 10 is capable of providing a financial network 54 between the financial institutions (banks) 16$_1$, 16$_2$, the need for a correspondent financial account held by the SCB-O 12 can be alleviated and the fund transfer transaction described herein above may be processed directly between the financial institutions (banks) 16$_1$ and 16$_2$ by moving funds from the sender's account to the receiver's account over the network 54. In this case, the SCB-O 12 solely forwards the fund transfer requests and transaction confirmation message.

Figure 5:
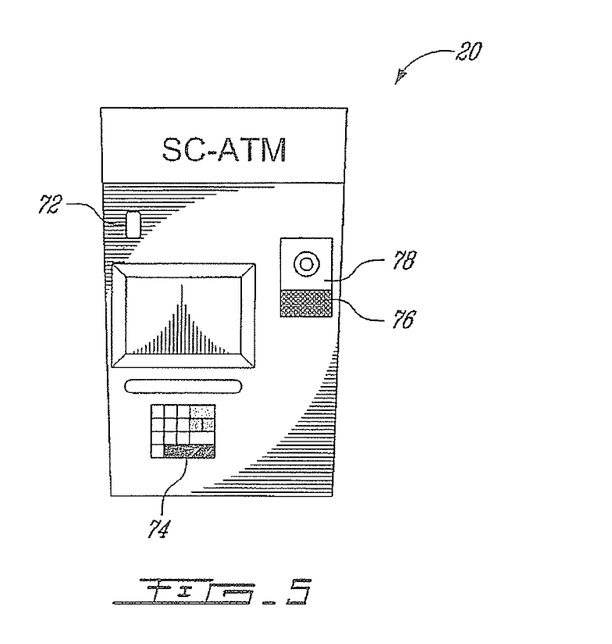
FIG. 5 is a schematic diagram of a Subscriber Identity Module SIM Chip Bank system Automated Teller Machine in accordance with an illustrative embodiment of the present invention.

Referring now to FIG. 5 in addition to FIG. 2 and FIG. 4, the system 10 enables users as in 14$_1$, 14$_2$ to access a SC-ATM 20 connected to the SCB-system 10. Illustratively, the SC-ATM 20 is implemented as a standard ATM machine modified to include a registered SIM chip 72 having assigned thereto a unique ATM identifier or ID number 74 in the SCB-system 10, an intercommunication device (intercom) 76 and optionally a camera 78 for receiving calls from the SCB-O 12 and providing visual confirmation (e.g. by initiating a third generation (3G) mobile phone video conference) of the identity of a user 14$_1$, 14$_2$ in relation to a requested service. Similarly to requests for financial transactions, a user 14$_1$ requesting the use of a particular SC-ATM 20 illustratively connects to the SCB-O 12 at 202 in order to have access to the SC-ATM 20. The SCB-O 12 in turn verifies the identity of user 14$_1$ and upon positive authentication, the IVR system 28 within the SCB-O 12 queries the user 14₁ for the ID number 74 of the SC-ATM 20. The SCB-O then connects the user 14₁ to the specific SC-ATM 20 at 216 by opening via the intercom 76 and camera 78 and for a predetermined time interval a live visual and vocal channel connection (may be recorded for security and legal purposes) between the user 14₁ and the SC-ATM 20. The user 14₁ then initiates a transaction, such as a request for withdrawal of banknotes, from the SC-ATM 20. If the SC-ATM 20 belongs to the financial institution (bank) 16₁, to which user 14₁ is affiliated, the SCB-O 12 connects to the financial institution (bank) 16₁ at 204 to request approval of the transaction, upon which approval the financial account of user 14₁ is debited and the money presented to the user 14₁ via the SC-ATM 20 in a conventional manner. Alternatively, if the SC-ATM 20 belongs to a financial institution (bank) 16₂ other than financial institution (bank) 16₁, the SCB-O 12 illustratively connects to the financial institution (bank) 16₂ at 208 to request the financial transaction and, upon completion thereof, the financial institution (bank) 16₂ requests a financial settlement from the SCB-O 12 corresponding to the monetary amount disbursed. A confirmation message that the transaction was successfully completed (or alternatively failed) is then sent at 212 to the user 14₁.

Figure 6:
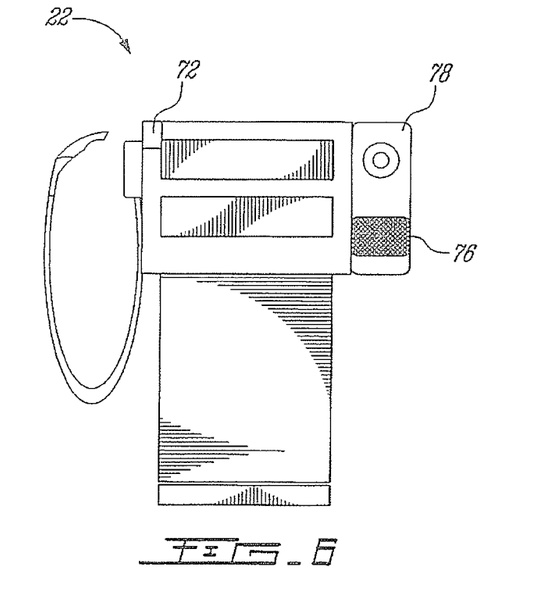
FIG. 6 is a schematic diagram of a Subscriber Identity Module SIM Chip Service Providing Machine in accordance with an illustrative embodiment of the present invention.

Referring now to FIG. 6 in addition to FIG. 2, when the user 14₁ wishes to connect to a SCSPM 22, such as a gas pump, the IVR system 28 illustratively similarly queries the user 14₁ for the ID number (SPM identifier) of the SCSPM 22 associated with the SIM chip 72 integrated therein. Upon entry of the requested ID number, the SCB-O then connects the user 14₁ to the specific SC-ATM 20 at 216 by opening via the intercom 76 and camera 78 and for a predetermined time interval a live two-way visual and vocal channel connection between the user 14₁ and the SCSPM 22. The SCB-O then queries and confirms the monetary amount to be paid prior to issuing an order to the financial institution (bank) 16₁ to transfer the requested amount to the SCSPM 22. Financial settlement between the financial institution (bank) (not shown) the SCSPM 22 is affiliated with and the financial institution (bank) 16₁ is illustratively processed in a manner similar to settlements discussed herein above. A confirmation message that the transaction was successfully completed (or alternatively failed) is then illustratively sent to the user 14₁.

Referring back to FIG. 1, the SCB-system 10 of the present invention advantageously allows users as in 14₁, 14₂ to perform direct and comprehensive bank services and cashless payments directly through their financial account without having to apply for a new bank card. Also, whereas most prior art systems require service providers to be equipped with Point-Of-Sale (POS) terminals to confirm occurrence of the transaction, the present invention alleviates the need for such POS terminals to obtain confirmation. Also, the present invention overcomes security concerns by using the unique identification (e.g. mobile phone number) associated with the SIM chip of the mobile device 24₁, 24₂. As such, there is no need for special SIM chips to be integrated in the mobile devices as in 24₁, 24₂ to provide users as in 14₁, 14₂ access to the SC-ATM 20 and/or SCSPM 22 and any SIM chip (and thus any mobile device 24₁, 24₂) may be registered with the system 10. Moreover, the present invention allows person-to-person transactions from any user 14₁, 14₂ to another user 14₁, 14₂, even if the other user 14₁, 14₂ is affiliated with a different bank 16₁, 16₂.

The invention claimed is:

1. An apparatus for enabling a user of a network enabled mobile device to effect financial transactions with a financial institution using the mobile device, the apparatus comprising:
    a network enabled mobile device having associated therewith an identifier, wherein said network enabled mobile device is associated with a generic SIM chip having the identifier associated therewith, wherein the identifier includes a phone number associated with the generic SIM chip, and wherein the generic SIM chip lacks any extrinsic information corresponding to the financial institution;
    a computerized system operator device comprising a first processor and a first customer database containing customer information associated with said identifier; and
    a computerized first financial institution device comprising a second processor and a second customer database containing customer information relating customer financial account information in association with said identifier;
    wherein the network enabled mobile device has been registered with the system operator device and with the first financial institution device for acquiring mobile payment service capabilities, the registration comprising associating said identifier with the first financial institution device and storing the information in a first database accessible to the system operator device, and in the second database accessible to the first financial institution device, and wherein said second database is different from the first database and is not accessible to the system operator device; and
    wherein the system operator device is configured to:
        establish a connection with the mobile device;
        receive a request for financial transaction from the user using said mobile device, said request including said identifier that is associated with the generic SIM chip;
        automatically authenticate said device through said identifier stored in the first database; and
        in response to being authenticated, established a connection with the first financial institution device and then send a request for the financial transaction to said first financial institution device, said request including said identifier; and
    wherein the first financial institution device is configured to:
        receive said request from the system operator device;
        use said identifier to retrieve from said database information used to communicate with said mobile device to request user confirmation of said request received from the system operator device; and
        in response to confirmation by the user, perform said financial transaction using said customer financial account information associated with said identifier in said second database; wherein both the system operator device and the first financial institution device separately use the identifier that is associated with the mobile to authenticate the user.

2. The apparatus of claim 1, wherein said network enabled mobile device is associated with a SIM chip, and the identifier is associated with the SIM chip.

3. The apparatus of claim 1, wherein the system operator device is configured to receive the request for the financial transaction from the device via a first connection between the device and the system operator device, the first connection established through a phone call initiated by the user using the device, and wherein the system operator device is configured to automatically authenticate said device by authenticating a voice of the user.

4. The apparatus of claim 1, wherein the system operator device is configured to receive the request for the financial transaction from the device via a first connection between the device and the system operator device, the first connection established through a text message transmitted by the user being the device, and wherein the system operator device is configured to automatically authenticate said device by validating a pin code or a password provided by the user.

5. The apparatus of claim 1, wherein the first financial institution device is configured to receive, in response to requesting user confirmation of said request received from the system operator device, the user confirmation, modification, or cancellation of said financial transaction.

6. The apparatus of claim 1, further comprising:
a service providing machine in communication with said system operator device, wherein the request for the financial transaction received by the system operator device from the device is a request for transferring funds in payment for a service provided to the user by said service providing machine.

7. The apparatus of claim 6, wherein the request for transferring funds is a request for transferring the funds form a first account associated with the user at the first financial institution device to a second account associated with the service providing machine at a second financial institution device different from the first financial institution device, wherein said system operator device is in communication with the first and second financial institution devices and has a first system operator account at the first financial institution device and a second system operator account at the second financial institution device, and the transferring of funds from said first account to said second account is carried out by an intermediary of said first and second system operator accounts.

8. A system for enabling users of network enabled mobile devices to effect financial transaction by directly accessing financial institution accounts at registered member financial institutions using the mobile devices, the mobile devices having associated therewith identifiers wherein the mobile devices are each associated with a corresponding generic SIM chip having one of the identifiers associated therewith, wherein the identifier includes a phone number associated with the generic SIM chip, and wherein the generic SIM chip lacks any extrinsic information corresponding to any of the registered member financial institutions, the system comprising:
a system operator comprising a processor, the system operator running operations configured to:
receive financial requests to effect financial transactions from uses through said network enabled mobile devices;
retrace the identifiers associated with the received financial requests;
authenticate said users said identifiers;
map said users to their respective member financial institutions among said registered member financial institutions using said identifiers;
establish communication channels with said users and with said member financial institutions through corresponding financial institutions having applications compatible with and pre-configured to operate with said system operator; and
intermediate between said users and said member financial institutions using said communication channels in order to facilitate said financial transaction, where said intermediate process comprises exchanging financial information in an automated and predefined manner;
wherein both the system operator and the first financial institution separately use the identifier that is associated with the mobile device to authenticate the user.

9. The system as claimed in claim 8, wherein said financial requests consist of fund transfer requests and said financial transactions consist of fund transfers from a first account associated with a first financial institution to a second account associated with a second financial institution different from said first financial institution, where said first and second financial institutions are among said registered member financial institutions.

10. The system as claimed in claim 9, wherein said first account is associated with a first user among said users and said second account is associated with a third party, where said first user uses a first mobile device associated with a first identifier to effect said fund transfers.

11. The system as claimed in claim 10, further comprising:
a first database storing records mapping each identifier among said identifiers (i) to a specific user among said users and (ii) to a specific financial institution account associated with a specific financial institution among said registered member financial institutions,
wherein said system operator is configured to authenticate by inquiring said first database to verify whether said identifier is in the records upon reception of a financial request from said first user using said first mobile device.

12. The system as claimed in claim 11, wherein said intermediation process by said system operator comprises automatically identifying said first account by inquiring said first database using said first identifier upon authentication of the first user, and generating and transmitting via said communication channels a fund transfer request to said first financial institution, where said fund transfer request comprises an identification of said first account, an identification of said second account, and a specification of a requested transfer amount.

13. The system as claimed in claim 12, further comprising:
a second database, wherein said intermediation process further comprises receiving, by said system operator, a fund transfer commitment from said first financial institution, storing said fund transfer commitment in said second database for future reference, and transmitting an indication of said fund transfer commitment to said second financial institution and to at least one of said first user and said third party.

14. The system as claimed in claim 13, wherein said intermediation process further comprises generating a financial report in connection with said fund transfer request, and storing said report in said second database for further reference.

15. The system as claimed in claim 10, wherein said third party is a second user among said users.

16. The system as claimed in claim 10, wherein said system operator is further configured to be connected to a service providing machine associated with said third party, and wherein said fund transfers consist of payment for services provided to the first user by said service providing machine.

17. The system as claimed in claim 10, wherein said system operator is further configured to be connected to a banking terminal associated with said third party, and wherein said fund transfer are for settlement for banknotes withdrawn from said banking terminal by said first user.

18. The system as claimed in claim 8, wherein said system operator has system operator accounts in at least some of said registered member financial institutions, and said intermediation process further comprises processing said financial transactions by an intermediary of at least one of said system operator accounts.

* * * * *

UNITED STATES PATENT AND TRADEMARK OFFICE
CERTIFICATE OF CORRECTION

PATENT NO. : 10,032,156 B2
APPLICATION NO. : 13/875028
DATED : July 24, 2018
INVENTOR(S) : Al-Sahli Page 1 of 1

It is certified that error appears in the above-identified patent and that said Letters Patent is hereby corrected as shown below:

In the Claims

At Column 11, Line 27, in Claim 7:
transferring funds is a request for transferring the funds form
Should be:
transferring funds is a request for transferring the funds from At Column 11, Line 55, in Claim 8:
from uses through said network enabled mobile
Should be:
from users through said network enabled mobile Signed and Sealed this
Twelfth Day of February, 2019

Andrei Iancu
*Director of the United States Patent and Trademark Office*